(12) United States Patent
Skogoe et al.

(10) Patent No.: US 9,465,415 B2
(45) Date of Patent: Oct. 11, 2016

(54) PORTABLE DEVICE

(71) Applicant: Tobii Technology AB, Danderyd (SE)

(72) Inventors: Maerten Skogoe, Danderyd (SE); John Elvesjoe, Stockholm (SE); Jan-Erik Lundkvist, Akersberga (SE)

(73) Assignee: Tobii AB, Danderyd (SE)

( * ) Notice: Subject to any disclaimer, the term of this patent is extended or adjusted under 35 U.S.C. 154(b) by 52 days.

(21) Appl. No.: 14/355,978

(22) PCT Filed: Oct. 2, 2012

(86) PCT No.: PCT/EP2012/069445
§ 371 (c)(1),
(2) Date: May 2, 2014

(87) PCT Pub. No.: WO2013/064320
PCT Pub. Date: May 10, 2013

(65) Prior Publication Data
US 2014/0300541 A1 Oct. 9, 2014

Related U.S. Application Data

(60) Provisional application No. 61/556,505, filed on Nov. 7, 2011.

(30) Foreign Application Priority Data

Nov. 4, 2011 (EP) ...................................... 11187816

(51) Int. Cl.
*G06F 1/16* (2006.01)
*G06F 3/01* (2006.01)

(52) U.S. Cl.
CPC ........... *G06F 1/1684* (2013.01); *G06F 1/1681* (2013.01); *G06F 1/1686* (2013.01); *G06F 3/011* (2013.01); *G06F 3/013* (2013.01); *G06F 3/017* (2013.01)

(58) Field of Classification Search
CPC .. G06F 1/1616; G06F 1/1681; G06F 1/1686; G06F 1/1679; Y10T 16/541; E05D 11/1078; E05D 3/122; H04M 1/022; E05Y 2900/606
See application file for complete search history.

(56) References Cited

U.S. PATENT DOCUMENTS 6,542,721 B2 * 4/2003 Boesen ................. G06F 1/1616
455/553.1
8,619,273 B2 * 12/2013 Mukai .................. G03G 15/605
358/1.13

(Continued)

OTHER PUBLICATIONS

International Searching Authority, International Search Report for International Application No. PCT/EP2012/069445, Nov. 14, 2012, 3 pages, European Patent Office, The Netherlands.

(Continued)

*Primary Examiner* — Abbas Abdulselam
(74) *Attorney, Agent, or Firm* — Alston & Bird LLP

(57) ABSTRACT

A portable device, e.g. a laptop, includes a first part (110), e.g. a base element, and a second part (120), e.g. a lid element. The second part (120) contains an optical remote sensing system (300). The second part (120) is pivotably attached to the first part (110) via a hinge means (115), such that the portable device may be arranged in an open and a closed position respectively. The optical remote sensing system (300) is configured to track at least one distinctive feature of a user of the portable device when arranged in the open position. The first and second parts (110; 120) have a respective essentially flat inner surface (111; 121), which when the portable device is arranged in the closed position are parallel and face one another. The first part (110) further includes a recess (112*a*) which is arranged relative to a position of the optical remote sensing system (300) such that, in the closed position, the optical remote sensing system (300) is at least partly contained in the recess (112*a*).

13 Claims, 3 Drawing Sheets

(56) References Cited

U.S. PATENT DOCUMENTS

| | | |
|---|---|---|
| 2002/0036617 A1 | 3/2002 | Pryor |
| 2005/0050686 A1 | 3/2005 | Kurokawa |
| 2005/0110887 A1 | 5/2005 | Shin et al. |
| 2010/0156781 A1* | 6/2010 | Fahn ................ H04M 1/72544 345/156 |
| 2012/0084676 A1* | 4/2012 | De Paz ................ G06F 1/1616 715/761 |

OTHER PUBLICATIONS

The International Bureau of WIPO, International Preliminary Report on Patentability for International Application No. PCT/EP2012/069445, May 15, 2014, 8 pages, Switzerland.

* cited by examiner

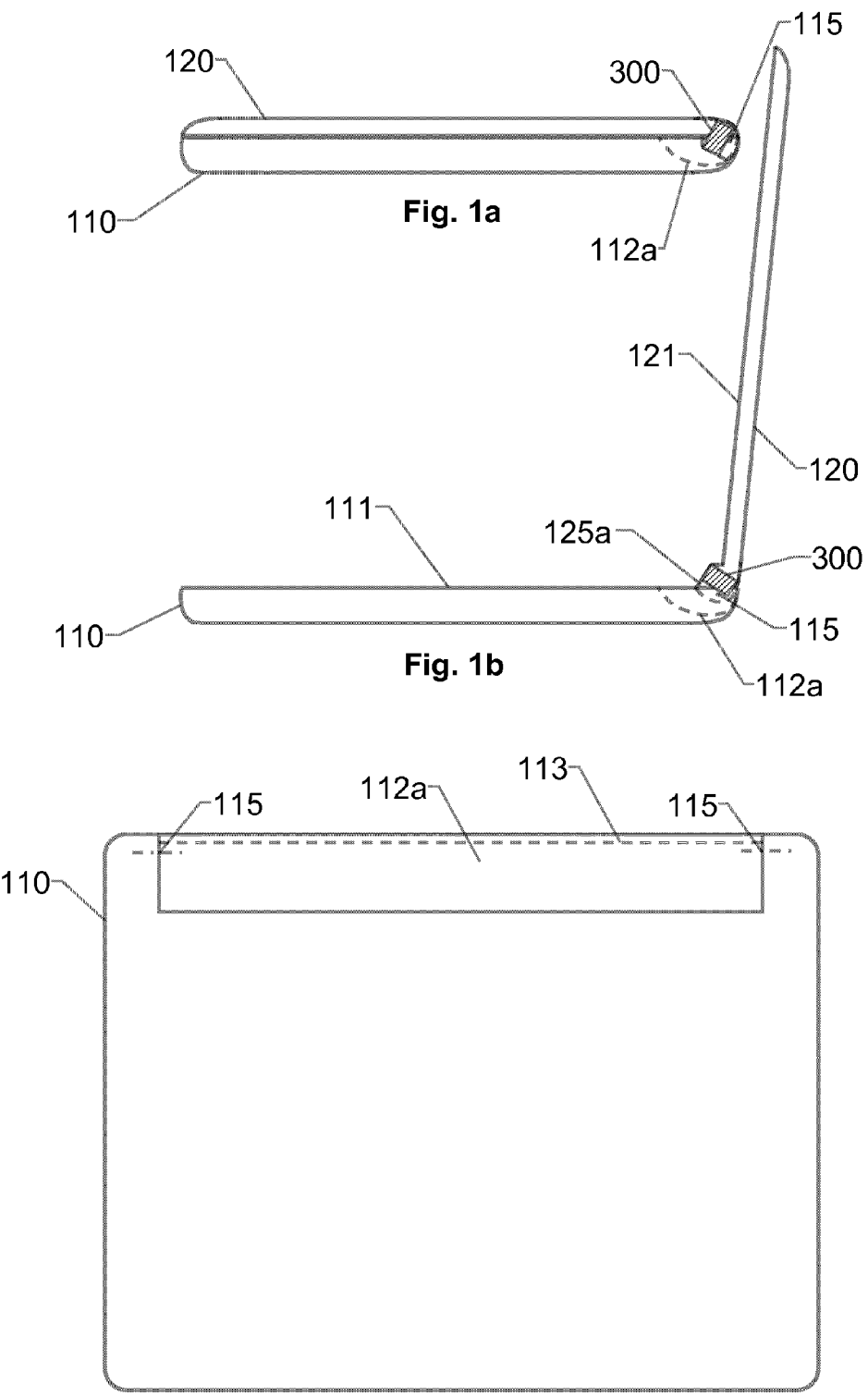

PORTABLE DEVICE

CROSS REFERENCE TO RELATED APPLICATIONS

This application is a national stage application, filed under 35 U.S.C. §371, of International Application No. PCT/EP2012/069445, filed Oct. 2, 2012, which claims priority to and the benefit of European Application No. 11187816.1, filed Nov. 4, 2011, and U.S. Provisional Application No. 61/556,505, filed Nov. 7, 2011, the contents of all of which as are hereby incorporated by reference in their entirety.

BACKGROUND

1. Related Field

The present invention relates generally to automatic tracking of distinctive features of users operating electronic equipment. More particularly, the invention relates to a portable device according to the preamble of claim 1.

2. Description of Related Art

Laptops with integrated eye-trackers are known. Unfortunately, the known solutions are comparatively bulky, and therefore the design becomes relatively thick, i.e. in closed/inactive mode, the laptop has a rather high profile. Naturally, this is undesired because portable devices, such as laptops, in general should be as compact and slim as possible. Nevertheless, bulkiness as such is associated with an advantage. Namely, the optical remote sensing systems of today's eye-trackers at times consume relatively large amounts of power. Therefore, substantial thermal power dissipation must be handled, and of course, in this context, a larger volume is more useful than smaller ditto. The trend where each generation of laptop is thinner than the foregoing generation is problematic because the available space in the lid becomes very limited. This places severe constraints on which components that can be used to implement eye-trackers and similar devices.

US 2005/0110887 shows an example of a mobile communication terminal with a main body and a foldable display body. A camera is here positioned in a hinge unit interconnecting the display body and the main body. The camera is rotatable around the hinge axis to register images of the user as well as subjects/objects in front of the user. Thus, a very versatile camera function is attained. However, since the camera is freely rotatable relative to both the main body and the display body it would be complicated to use the camera for any purposes other than simple image registering, such as for eye-tracking.

In the light of the above, it is challenging to accomplish a compact and yet resourceful portable device that is equipped with an optical remote sensing system for eye-, gaze, gesture and/or facial feature tracking and/or user identification through face or iris recognition or hand gesture detection.

BRIEF SUMMARY

The object of the invention is to mitigate the above problems and accomplish a slim portable device with an integrated optical remote sensing system for eye- and/or gesture tracking.

According to the invention, the object is achieved by the initially described apparatus, wherein the first part includes a recess, which is arranged relative to a position of the optical remote sensing system such that, in the closed position, the optical remote sensing system is at least partly contained in the recess.

This portable device is advantageous because it enables an overall slim design to be combined with an adequate cooling volume for the optical remote sensing system. This is a desirable feature in any portable device, including: laptops, note books, ultrabooks, tablets with keyboards, personal digital assistants and smartphones.

According to one preferred embodiment of the invention, the recess is co-located with a first piece of the hinge means. The optical remote sensing system is further disposed in a projection of the second part where a second piece of the hinge means is located. The first and second pieces of the hinge means represent a pivot axis via which the first and second parts of the portable device are interconnected. Such an integration of the optical remote sensing system in the hinge means is desirable because it provides a volume sufficient to ensure adequate cooling of the optical remote sensing system while the tracking functionality can be integrated in an essentially indiscernible manner into the portable device.

According to another preferred embodiment of the invention, the first and second parts of the portable device are interconnected via the hinge means along a proximal side of the second part. The optical remote sensing system is here disposed in a projection extending along a distal side of the second part, where the distal side is opposite to the proximal side. In a laptop implementation, this means that the optical remote sensing system is located above the screen when the device is arranged in the open/active mode. Such a positioning is especially advantageous if a user's gestures are to be interpreted by the optical remote sensing system.

According to yet another preferred embodiment of the invention, the second essentially flat surface of the second part includes a display unit (e.g. an LCD screen) configured to present information to the user. It is further preferable if the first essentially flat surface of the first part includes a keyboard configured to receive input commands from the user. Hence, the optical remote sensing system is included in the same part as the display unit.

According to still another preferred embodiment of the invention, the optical remote sensing system is arranged such that a view angle thereof has a fixed spatial relation to the display unit irrespective of an orientation of the second part relative to the first part. Of course, this is desirable because thereby it is fairly straightforward to determine the user's point of regard on the display unit based on data registered by the optical remote sensing system.

According to a further preferred embodiment of the invention, the first part is a base element and the second part is a lid element. During operation, the base element is configured to be placed on an essentially flat supporting surface (e.g. a desk) while the lid element is positioned upright, so that its essentially flat inner surface (typically containing a display unit) is visible to the user.

According to other preferred embodiments of the invention, the optical remote sensing system includes an image registering unit (e.g. a still camera or a video camera), and preferably, at least one illuminator configured to illuminate the user. A combined camera-and-illuminator is generally advantageous for cost efficiency. In eye-tracker implementations it is also desirable that one or more light sources be arranged close to the optical axis of the image registering unit. The invention, however, is likewise applicable to designs where the light source and the image registering unit are separated from one another. In any case, it is generally preferable that the optical remote sensing system includes an optical filter, which is arranged in front of an illuminator and/or an image registering unit therein, and which optical filter is configured to block visible light however is transparent to near-infrared (NIR) light. Namely, as will be discussed below, NIR light is desirable, whereas visible light may disturb the user.

According to still another preferred embodiment of the invention, at least one of the at least one illuminator is configured to produce structured light, which when registered by the image registering unit, causes resulting data to be created, which resulting data are adapted for generating a depth map of the user. This is advantageous both when interpreting gestures and in eye-tracking, for instance when selecting a relevant image segment to process.

According to yet another preferred embodiment of the invention, at least one of the at least one illuminator is configured to produce near-infrared light. Namely, this type of light is relatively uncomplicated to detect by a camera, however invisible to the human eye.

It is further preferred that at least one of the at least one illuminator is configured to produce a light beam whose direction is controllable, so that a varying position of the user can be tracked. Directional optical illuminators are advantageous relative to static ditto because, at each point in time, the directional illuminator only illuminates a fraction of a surface inside a volume within which the subject moves. Thereby, power is conserved corresponding to the size of the non-illuminated surface that would otherwise have been illuminated.

According to another preferred embodiment of the invention, at least one of the at least one illuminator is based on LED (Light Emitting Diode) technology. Namely, LEDs represent energy-efficient, compact and reliable light sources.

According to still another preferred embodiment of the invention, at least one of the at least one illuminator is configured to produce coherent light. Coherent light sources (e.g. lasers) are desirable, since such a light source may be combined with diffractive optical elements to transform a light beam into a desired spatial pattern. Thus, the illumination can be controlled very efficiently, for instance to follow a position of the user.

According to a further preferred embodiment of the invention, the optical remote sensing system includes an eye tracker configured to repeatedly determine a position of at least one eye of the user and/or repeatedly determine a point of regard of the user relative to the portable device. Thereby, it is possible to generate input commands to a laptop based on the user's ocular activity.

Further advantages, beneficial features and applications of the present invention will be apparent from the following description and the dependent claims.

BRIEF DESCRIPTION OF THE FIGURES

The invention is now to be explained more closely by means of preferred embodiments, which are disclosed as examples, and with reference to the attached drawings.

FIGS. 1a-b show side views of a portable device according to a first embodiment of the invention;

FIG. 2 shows a top view of a first part of the portable device in FIGS. 1a and 1b;

DETAILED DESCRIPTION OF VARIOUS EMBODIMENTS

Figure 3A:
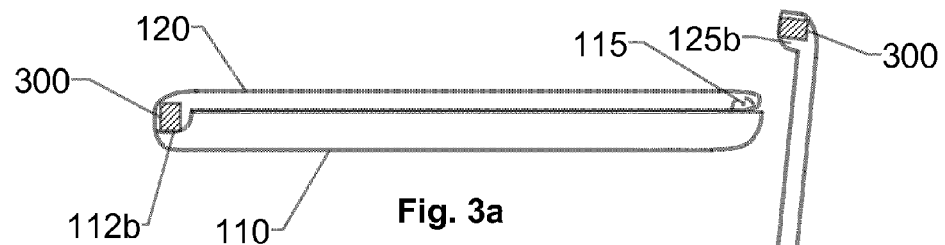
FIGS. 3a-b show side views of a portable device according to a second embodiment of the invention.

We refer initially to FIGS. 1a and 1b, which show side views of a portable device including a remote optical sensing system 300 according to a first embodiment of the invention. For convenience, the portable device is here embodied as a laptop. However, according to the invention, the portable device may equally well be represented by an alternative electronic device, such as a note book, an ultra-book, a tablet with a keyboard, a personal digital assistant (PDA) or a smartphone.

The proposed portable device includes a first part 110 (here represented by a laptop base element) and a second part 120 (here represented by a laptop lid element). The second part 120, in turn, includes the optical remote sensing system 300. As is common in laptops, the second part 120 is pivotably attached to the first part 110 via a hinge means 115, such that the portable device may be arranged in an open and a closed position respectively. FIG. 1a illustrates the closed position (predominantly used when the device is inactive) and FIG. 1b illustrates the open position (the typical position when the device is activated). The optical remote sensing system 300 is configured to track at least one distinctive feature of a user of the portable device when the device is active and arranged in the open position. The at least one distinctive feature may be an eye, a facial feature and/or a limb of the user, such as his/her hand. Thereby, the optical remote sensing system 300 may be used for eye-, gaze, gesture and/or facial feature tracking and/or user identification through face or iris recognition or hand gesture detection.

The first and second parts 110 and 120 have a respective essentially flat inner surface 111 and 121. When the portable device is arranged in the closed position, the essentially flat inner surfaces 111 and 121 are parallel and face one another, as can be seen in FIG. 1a. The inner surfaces 111 and 121 are not entirely flat. Namely, for example, the first part 110 has a recess 112a in the essentially flat inner surface 111, which recess 112a is arranged relative to a position of the optical remote sensing system 300 in the second part 120, such that, in the closed position, the first part 110 receives a projection 125a of the second part 120, which projection 125a includes the optical remote sensing system 300. As a result, the optical remote sensing system 300 is at least partly contained in the recess 112a when the portable device is arranged in the closed position (i.e. normally the inactive mode).

The first essentially flat surface 111 of the first part 110 preferably also includes a keyboard configured to receive input commands from the user. Moreover, the second essentially flat surface 121 of the second part 120 preferably includes a display unit 122 (see FIG. 5) configured to present information to the user, such as text, graphics, images and/or video.

FIG. 2 shows a top view of the first part 110 of the portable device in FIGS. 1a and 1b. The recess 112a preferably extends between a pair of hinge means 115 (symbolically illustrated with dashed lines), which in turn are arranged in proximity to the portable device's sides. Above the hinge means 115, the second part 120 preferably extends to a full width of the first part 110 (not shown).

As is apparent from FIGS. 1a, 1b and 2, the recess 112a is co-located with a first piece of the hinge means 115, say a female piece. A second piece of the hinge means 115, say a male piece, is located on the projection 125a of the second part 120. The first and second pieces of the hinge means 115 represent a pivot axis via which the first and second parts 110 and 120 are interconnected. Hence, as is shown in FIG. 1a (and in further detail in FIG. 5), when the portable device is closed, the projection 125a is configured to swing down into the recess 112a, so that the recess 112a houses the optical remote sensing system 300, at least partly. It is technically possible that the recess 112a is represented by a complete, or partial, cut-out in the first part 110. The dashed line 113 in FIG. 2 shows an example of where an edge of such a partial cut-out may be located. Nevertheless, it is desirable that a bottom part of the recess 112a covers at least any optical filter in front of an illuminator and/or an image registering unit in the optical remote sensing system 300 when the portable device is closed. For optimal compactness of the portable device, the recess 112a should be as deep as possible; i.e. in closed mode, as much as possible of the optical remote sensing system 300 should be contained in the recess 112a (or 112b, see below). This means that the bottom of the recess 112a may be a 2 mm thick tongue covering a front-most side of the optical remote sensing system 300 when the portable device is closed.

Figure 3B:
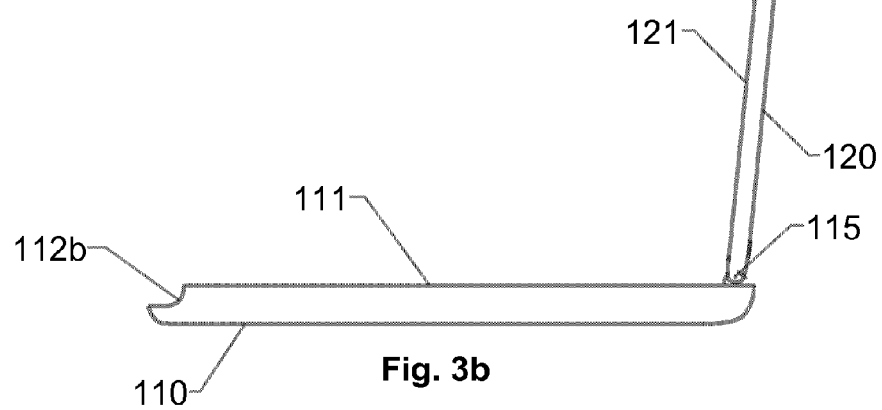
Figure 4:
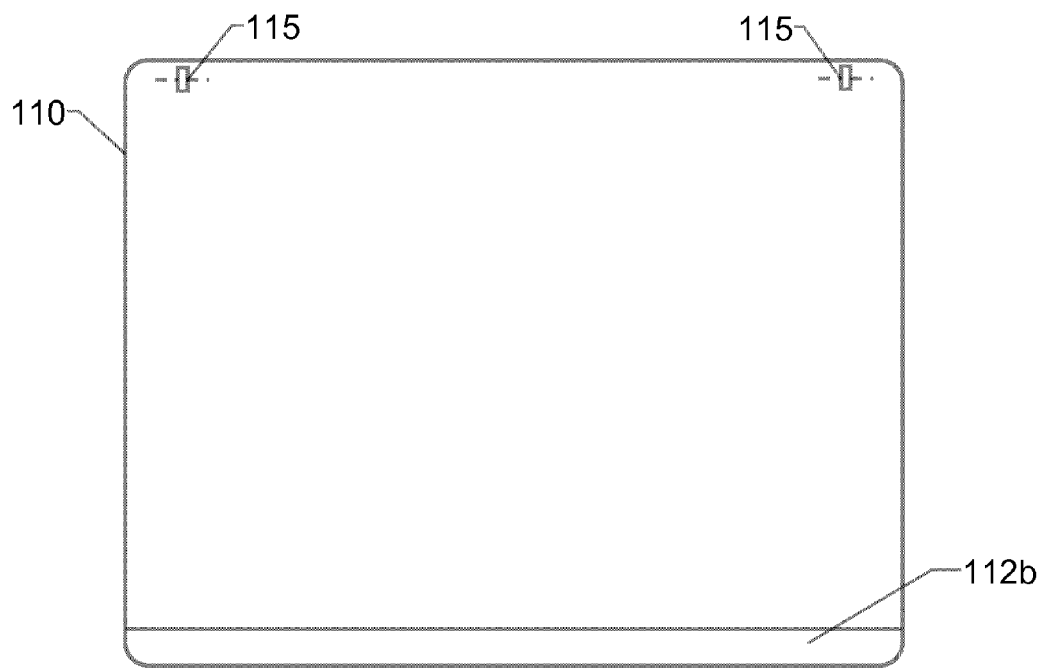
FIG. 4 shows a top view of a first part of the portable device in FIGS. 3a and 3b.

FIGS. 3a and 3b show side views of a portable device including an optical remote sensing system 300 according to a second embodiment of the invention. FIG. 4 shows a top view of the first part 110 of the portable device in FIGS. 3a and 3b. In FIGS. 3a, 3b and 4 all elements having labels which also occur in FIGS. 1a, 1b and/or 2 represent the same entities as those described above with reference to FIGS. 1a, 1b and/or 2.

Again, the portable device has first and second parts 110 and 120 that are pivotably attached to one another, such that the portable device may be arranged in an open and a closed position respectively. In this case, however, the optical remote sensing system 300 is not co-located with the hinge means 115. Instead, the optical remote sensing system 300 is disposed in a projection 125b extending along a distal side of the second part 120, whereas the hinge means 115 are arranged along a proximal side of the second part 120, which proximal and distal sides are opposite to one another.

Figure 5:
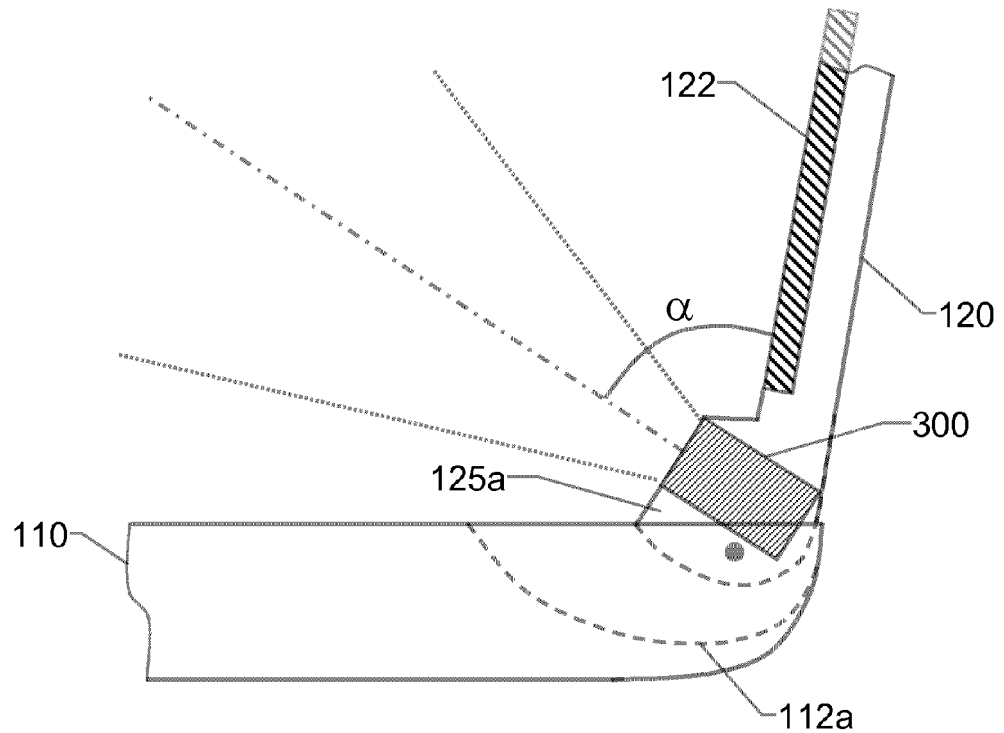
FIG. 5 illustrates, in further detail, the first embodiment of the invention depicted in FIGS. 1a, 1b and 2.

FIG. 5 illustrates in further detail the first embodiment of the invention depicted in FIGS. 1a, 1b and 2. Here, the optical remote sensing system 300 is arranged in the projection 125a of the second part 120, which is co-located with the hinge means 115. Preferably, the optical remote sensing system 300 is further arranged such that a view angle α thereof has a fixed spatial relation to the display unit 122 irrespective of an orientation of the second part 120 relative to the first part 110. The ideal view angle α depends on the specific characteristics of an image registering unit included in the optical remote sensing system 300. However, preferably α has a value in the range 50° to 65°, more preferably 56° to 60°, and most preferably α≈58°. Namely, thereby the risk that the user's hands block the optical remote sensing system 300 is relatively low, and at the same time, an acceptable angle towards the user's face is attained for the most commonly used inclinations of the second part 120 relative to the first part 110 in the active mode. Hence, for example the user's point of regard on the display unit 122 can be determined repeatedly based on data from an eye-tracker of the optical remote sensing system 300.

Figure 6:
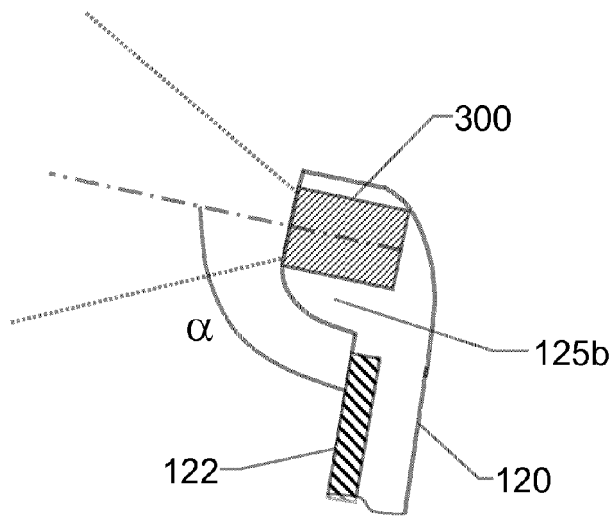
FIG. 6 illustrates, in further detail, the second embodiment of the invention depicted in FIGS. 3a, 3b and 4.

FIG. 6 illustrates in further detail the second embodiment of the invention depicted in FIGS. 3a, 3b and 4. Here, the optical remote sensing system 300 is arranged in the projection 125b of the second part 120, which extends along a side of the second part that is opposite to the side where the hinge means 115 are located. Also in this embodiment, the optical remote sensing system 300 is preferably arranged such that a view angle α thereof has a fixed spatial relation to the display unit 122 irrespective of an orientation of the second part 120 relative to the first part 110. Nevertheless, in this case, the view angle α preferably has a value in the range 80° to 100°, and most preferably α≈90°. Thus, the optical remote sensing system 300 may be efficiently used for eye- and/or gaze tracking as well as for interpretation of facial expressions and/or gestures.

Irrespective of whether the optical remote sensing system 300 is co-located with the hinge means 115 (as in FIG. 5), or arranged in proximity to a distal side thereof (as in FIG. 6), it is generally desirable that an illuminator and/or an image registering unit of the optical remote sensing system 300 is covered by an optical filter, which, preferably, is configured to block visible light while permitting NIR light to pass through.

Additionally, regardless of the location of the optical remote sensing system 300, according to preferred embodiments of the invention, the optical remote sensing system 300 includes an image registering unit and at least one illuminator configured to illuminate the user. The image registering unit, in turn, may contain a still and/or a video camera configured to capture image data representing the user of the portable device, such as images of his/her eyes.

It is further advantageous if at least one of the at least one illuminator is configured to produce structured light, which when reflected against the user and registered by the image registering unit causes resulting data to be created, which resulting data are adapted for generating a depth map of the user. Depth maps are advantageous both when interpreting gestures and during eye-tracking, for instance when selecting a relevant image segment to process.

Moreover, one or more of the at least one illuminator may be configured to produce (NIR) light. NIR light is advantageous because it is relatively uncomplicated to detect by a camera and because it is invisible to the human eye. Thus, NIR light does not disturb the user.

It is further advantageous if one or more of the at least one illuminator is configured to produce a light beam whose direction is controllable to track a varying position of the user. If at least one of the at least one illuminator is configured to produce coherent light, diffractive optical elements (DOE) may be used to transform the light beam into a desired spatial pattern. Thus, the illumination can be controlled very efficiently, for instance to follow a position of the user.

Alternatively, or as a complement, at least one of the at least one illuminator may be based on LED technology. LEDs are desirable light sources since they are energy-efficient, compact and reliable.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A portable device comprising:
   a first part (110); and
   a second part (120) comprising an optical remote sensing system (300),
   wherein:
   the second part (120) is pivotably attached to the first part (110) via a hinge means (115) such that the portable device may be arranged in an open and a closed position respectively;
   the optical remote sensing system (300) is configured to remotely track at least one distinctive feature of a user of the portable device when arranged in the open position;
   the first and second parts (110; 120) have respective essentially flat inner surfaces (111; 121), which when the portable device is arranged in the closed position are parallel and face one another;
   the first part (110) comprises a recess (112a; 112b), which is arranged relative to a position of the optical remote sensing system (300) such that, in the closed position, the optical remote sensing system (300) is at least partly contained in the recess (112a; 112b);
   the second essentially flat surface (121) of the second part (120) includes a display unit (122) configured to present information to the user; and
   the optical remote sensing system (300) is arranged such that a view angle (a) thereof has a fixed spatial relation to the display unit (122) irrespective of an orientation of the second part (120) relative to the first part (110).

2. The portable device according to claim 1, wherein the recess (112a) is co-located with a first piece of the hinge means (115) and the optical remote sensing system (300) is disposed in a projection (125a) of the second part (120) where a second piece of the hinge means (115) is located, the first and second pieces defining a pivot axis of the hinge means (115) via which the first and second parts (110; 120) of the portable device are interconnected.

3. The portable device according to claim 1, wherein:
   the first and second parts (110; 120) of the portable device are interconnected via the hinge means (115) along a proximal side of the second part (120); and
   the optical remote sensing system (300) is disposed in a projection (125b) extending along a distal side of the second part (120), the distal side being opposite to the proximal side.

4. The portable device according to claim 1, wherein the first essentially flat surface (111) of the first part (110) includes a keyboard configured to receive input commands from the user.

5. The portable device according to claim 1, wherein the first part (110) is a base element and the second part (120) is a lid element, and during operation, the base element (110) is configured to be placed on an essentially flat supporting surface while the lid element (120) is positioned so that its essentially flat inner surface (121) is visible to the user.

6. The portable device according to claim 1, wherein the optical remote sensing system (300) comprises an image registering unit configured to register image data representing the user.

7. The portable device according to claim 6, wherein the optical remote sensing system (300) comprises at least one illuminator configured to illuminate the user with structured light, which when registered by the image registering unit, creates resulting data adapted for generating a depth map of the user.

8. The portable device according to claim 6, wherein the optical remote sensing system (300) comprises at least one illuminator configured to produce near-infrared light.

9. The portable device according to claim 6, wherein the optical remote sensing system (300) comprises at least one illuminator configured to produce a light beam whose direction is controllable to track a varying position of the user.

10. The portable device according to claim 6, wherein the optical remote sensing system (300) comprises at least one illuminator which is based on LED technology.

11. The portable device according to claim 6, wherein the optical remote sensing system (300) comprises at least one illuminator which is configured to produce coherent light.

12. The portable device according to claim 1, wherein the portable device is at least one electronic device selected from a group consisting of: a laptop, a note book, an ultrabook, a tablet with a keyboard, a personal digital assistant, and a smartphone.

13. The portable device according to claim 1, wherein the optical remote sensing system (300) comprises an eye tracker configured to at least one of repeatedly determine a position of at least one eye of the user or repeatedly determine a point of regard of the user relative to the portable device.

* * * * *

UNITED STATES PATENT AND TRADEMARK OFFICE
CERTIFICATE OF CORRECTION

PATENT NO. : 9,465,415 B2  
APPLICATION NO. : 14/355978  
DATED : October 11, 2016  
INVENTOR(S) : Skogoe et al.

Page 1 of 1

It is certified that error appears in the above-identified patent and that said Letters Patent is hereby corrected as shown below:

On the Title Page  
Item "(71) Applicant: Tobii Technology AB" should read --(71) Applicant: Tobii AB--

Signed and Sealed this  
Third Day of January, 2017

Michelle K. Lee  
*Director of the United States Patent and Trademark Office*